(12) United States Patent
Overdick et al.

(10) Patent No.: US 7,408,165 B2
(45) Date of Patent: Aug. 5, 2008

(54) DETECTOR ARRANGEMENT

(75) Inventors: Michael Overdick, Langerwehe (DE); Matthias Simon, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 360 days.

(21) Appl. No.: 10/525,472

(22) PCT Filed: Aug. 14, 2003

(86) PCT No.: PCT/IB03/03638

§ 371 (c)(1),
(2), (4) Date: Feb. 23, 2005

(87) PCT Pub. No.: WO2004/021698

PCT Pub. Date: Mar. 11, 2004

(65) Prior Publication Data

US 2005/0242270 A1     Nov. 3, 2005

(30) Foreign Application Priority Data

Aug. 30, 2002   (DE)   ................................ 102 40 062

(51) Int. Cl.
 *H01L 25/00*   (2006.01)
(52) U.S. Cl. .................................. 250/370.09; 250/332
(58) Field of Classification Search ............ 250/370.09, 250/332
See application file for complete search history.

(56) References Cited

U.S. PATENT DOCUMENTS 5,291,018 A *   3/1994   Charpentier ................ 250/332
6,021,173 A     2/2000   Brauers et al.
6,414,294 B1 *  7/2002   Marshall et al. .......... 250/208.1

* cited by examiner

*Primary Examiner*—Christine Sung

(57) ABSTRACT

The invention relates to a detector arrangement for the conversion of electromagnetic radiation into electrical signals. The detector arrangement includes sensitive areas (D1, D2, D3, D4), where each sensitive area corresponds to a respective electrical signal, and at least two of the sensitive areas mesh with one another in such a manner that non-overlapping envelopes (C1, C2, C3, C4) of the individual meshing sensitive areas also mesh with one another.

16 Claims, 5 Drawing Sheets

D4 = D4.1+D4.2+D4.3+D4.4

DETECTOR ARRANGEMENT

Figure 1:
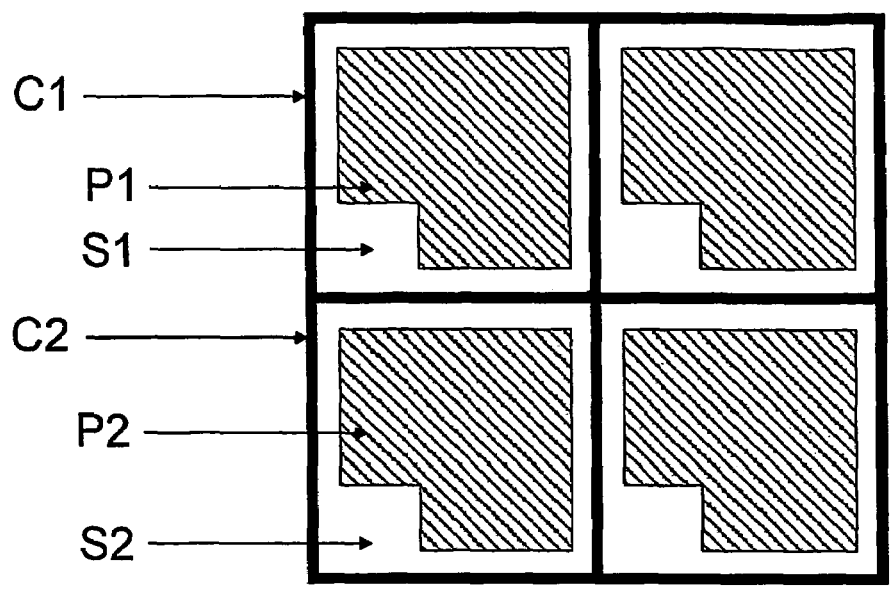

The invention relates to a detector arrangement which is intended to convert electromagnetic radiation into electrical signals and includes sensitive areas.

Detector arrangements which convert electromagnetic radiation into electrical signals are used in a variety of applications, for example, in CCD cameras or in X-ray detectors. Because detector arrangements of this kind are often manufactured in an integrated process, the sensitive areas (for example, photodiodes) have essentially a simple geometrical structure, for example, a rectangular shape, so that read-out leads and supply leads can be readily realized between the sensitive areas. A detector arrangement of this kind is usually intended to generate, by way of a source of electromagnetic radiation, a projection of an image (object image) which is converted into a measured image (data image) by the detector arrangement. The detector arrangement absorbs the electromagnetic radiation and converts it, directly or indirectly, into electrical signals (typically charge signals, current signals and/or voltage signals). As a result of the sensitive areas, localized scanning of the object image takes place. Ultimately, the data image (display image) is presented on a display medium, for example, a monitor, that is, possibly after post-processing of the data; the display image then consists of a discrete number of pixels, typically arranged in a matrix structure of n×m pixels, where n and m are integers. A pixel is usually associated with a sensitive area or with a group of sensitive areas, but the display image matrix may also be calculated by interpolation of the data image values. For example, the matrix of rectangularly arranged pixels can be calculated from a matrix of hexagonally arranged detector elements.

Detector arrangements of this kind are important in particular for medical imaging. When a detector arrangement of this kind consists of a scintillator layer and photodiodes which are situated therebelow, incident X-rays are converted into optical light quanta by the scintillator layer; the photodiodes, constituting the sensitive areas in this case, absorb the light quanta and charge carriers are generated. Because the process of converting X-rays into light quanta in a scintillator layer is a process in which the light quanta generated are isotropically emitted from the location in which they are generated, a photodiode cannot be unambiguously associated with a part of the surface of the scintillator layer. As a result, the object function of a sharp edge is not represented by a sharp "staircase structure" in the pixels of the display image, but by a "soft" edge structure; the "softness" of the edge, that is the width of the edge, is then dependent on the size of the sensitive areas and on the thickness and the type of scintillation material (for example, chemical composition, specific density, structuring) and further variables. Such softening (or low-pass filtering) of an object function by the detector is also described by the modulation transfer function (MTF) of the detector (electronic effects being ignored in this context). The "softening" leads to a reduction of high frequencies in the object function.

In the case of a spatially discrete scanning of the object function the modulation transfer function imposed by the finite dimensions of the sensitive areas of the photodiodes is strongly limited in the reproduction of high frequencies. When the object function of a sharp edge is scanned by such a photodiode arrangement, the high frequencies of the object function lead to disturbing aliasing effects. A scintillator layer significantly reduces aliasing effects due to the "softening" of the incident object function, that is, by suppressing the high frequencies. The low-pass filtering of the relevant object function, caused by the scintillator and taking place prior to the discrete scanning by the photodiodes of finite dimensions, is also referred to as pre-sampling filtering.

If the detector arrangement does not include a scintillator layer which suppresses the high frequencies of the object function already before the sensitive areas of the detector elements, disturbing aliasing effects occur. One example in this respect is an X-ray detector which consists of a directly converting material and comprises a non-structured top electrode at the X-ray side and single electrodes, constituting the sensitive areas in the present example, on the lower side of the directly converting material. Incident X-rays are absorbed by the directly converting material so as to be converted into charge carriers. The charge carriers are accelerated by means of a strong electrical field between the top electrode and the single electrodes so as to be converted into an electronic current signal. The strong electrical field between the top electrode and the single electrodes ensures that only little crosstalk occurs between the detector elements. Thus, the pre-sampling filtering which enhances the imaging properties is essentially absent in this case.

It is an object of the present invention to improve a detector arrangement for the conversion of electromagnetic radiation into electrical signals in such a manner that aliasing effects are reduced.

This object is achieved by means of a detector arrangement for the conversion of electromagnetic radiation into electrical signals which includes sensitive areas, each of which corresponds to a respective electrical signal, it being arranged that at least two of the sensitive areas mesh with one another.

This is particularly advantageous for detector arrangements without pre-sampling filtering in which, therefore, the sensitive areas define essentially the sampling of the object function. However, when the sensitive areas mesh with one another, there will be parts of a sensitive area which not only adjoin parts of another sensitive area, but partly or completely enclose such parts or are enclosed thereby, or there will be parts of sensitive areas which are enclosed completely by parts of another sensitive area. Such meshing leads to less sharp confinement of the sampling and hence to a reduction of the aliasing effects.

Claim 2 discloses a particularly advantageous embodiment of the invention in which the meshing of the sensitive areas with one another is realized by means of dentation (coherent meshing) or by interleaving (incoherent meshing).

In respect of their sampling properties for the object function the sensitive areas are defined in conformity with claim 3, that is, by way of respective associated sensitive surfaces which mesh with one another.

Sensitive areas which are sensitive either to electromagnetic radiation or to the conversion products of a conversion layer which forms part of the detector arrangement are advantageously realized way of photodiodes or electrodes as described in claim 4. In these cases the surfaces of the sensitive areas define the sampling properties of the sensitive areas.

Claim 5 discloses an advantageous embodiment of the invention which comprises sensitive areas of equal size. This results in homogenization of the detector properties (for example, signal level, dark current etc.). It is also advantageous when the shape of the sensitive areas varies, so that moiré like effects can be avoided (claim 6).

The invention also relates to an X-ray apparatus, notably an imaging X-ray apparatus, in which the detector arrangement in accordance with the invention is employed.

The invention also relates to a method of detecting electromagnetic radiation.

Figure 2:
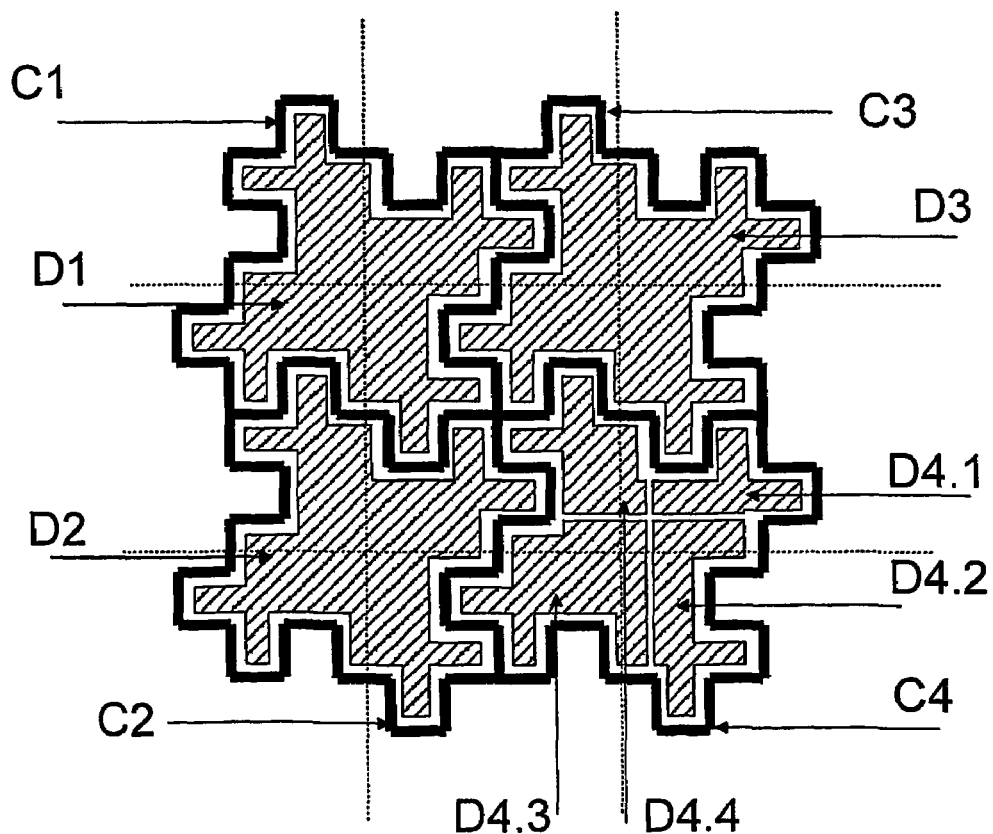
Figure 3:
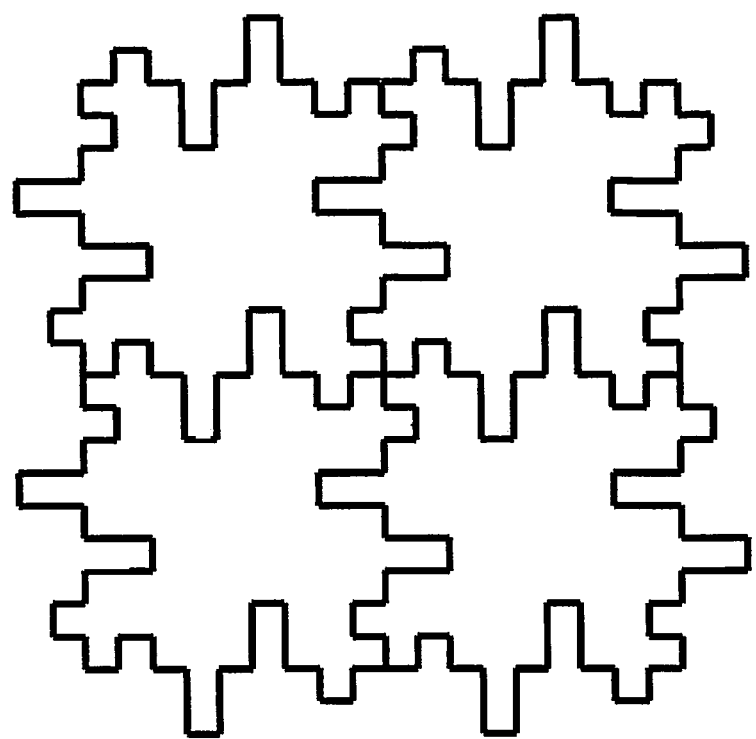
Figure 4:
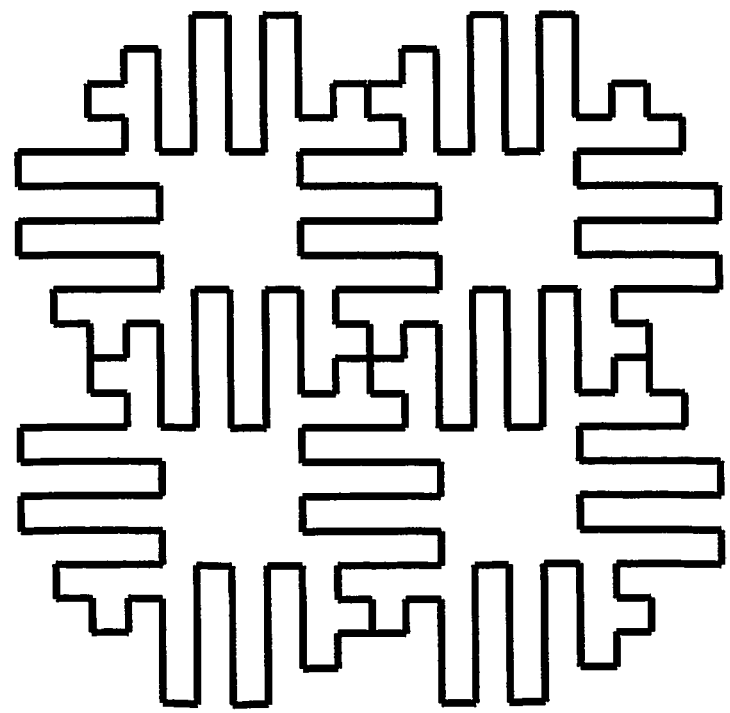
Figure 5:
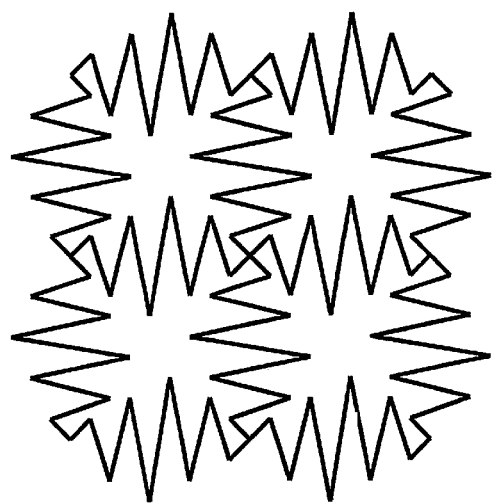
Figure 6:
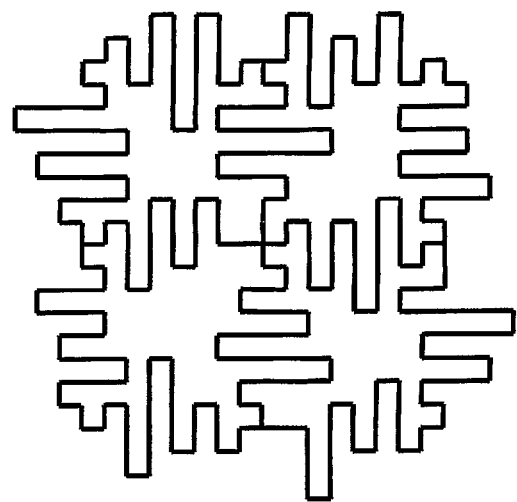
Figure 7:
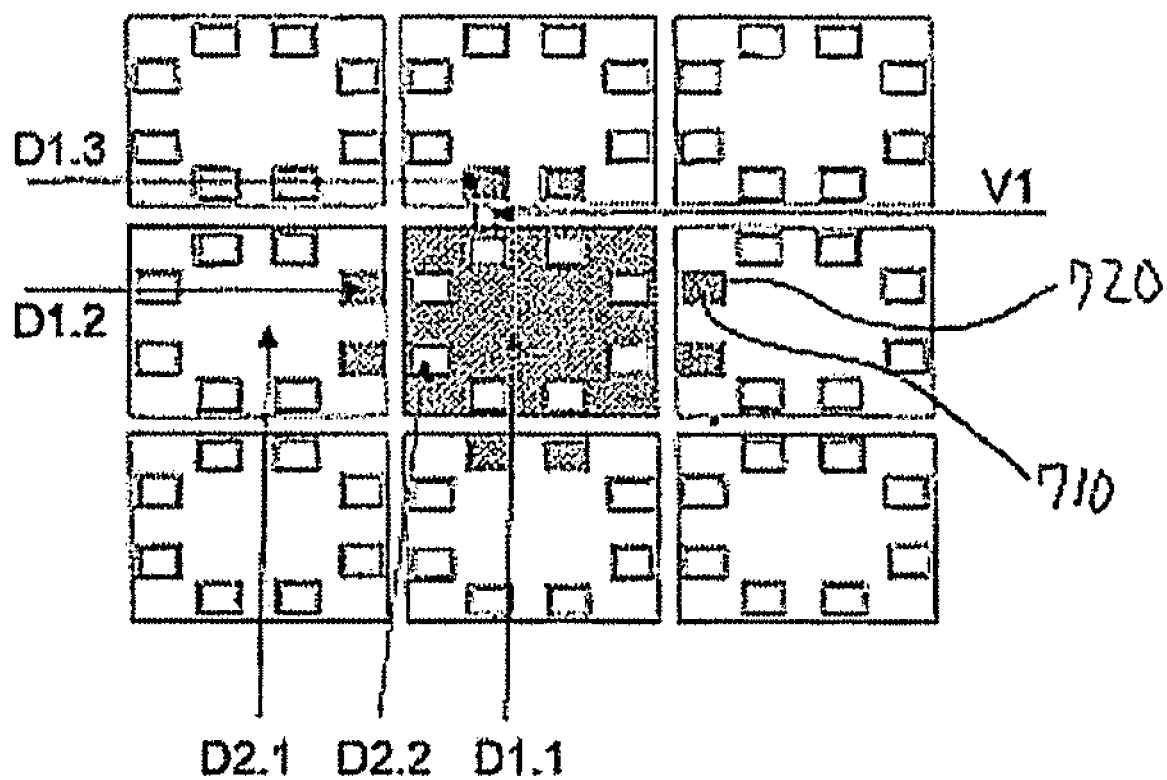
Figure 8:
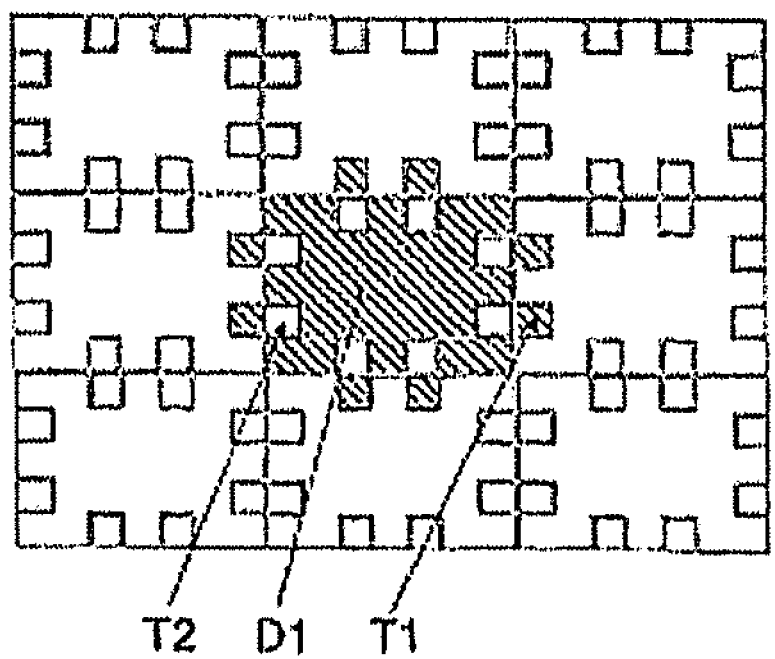
Figure 9:
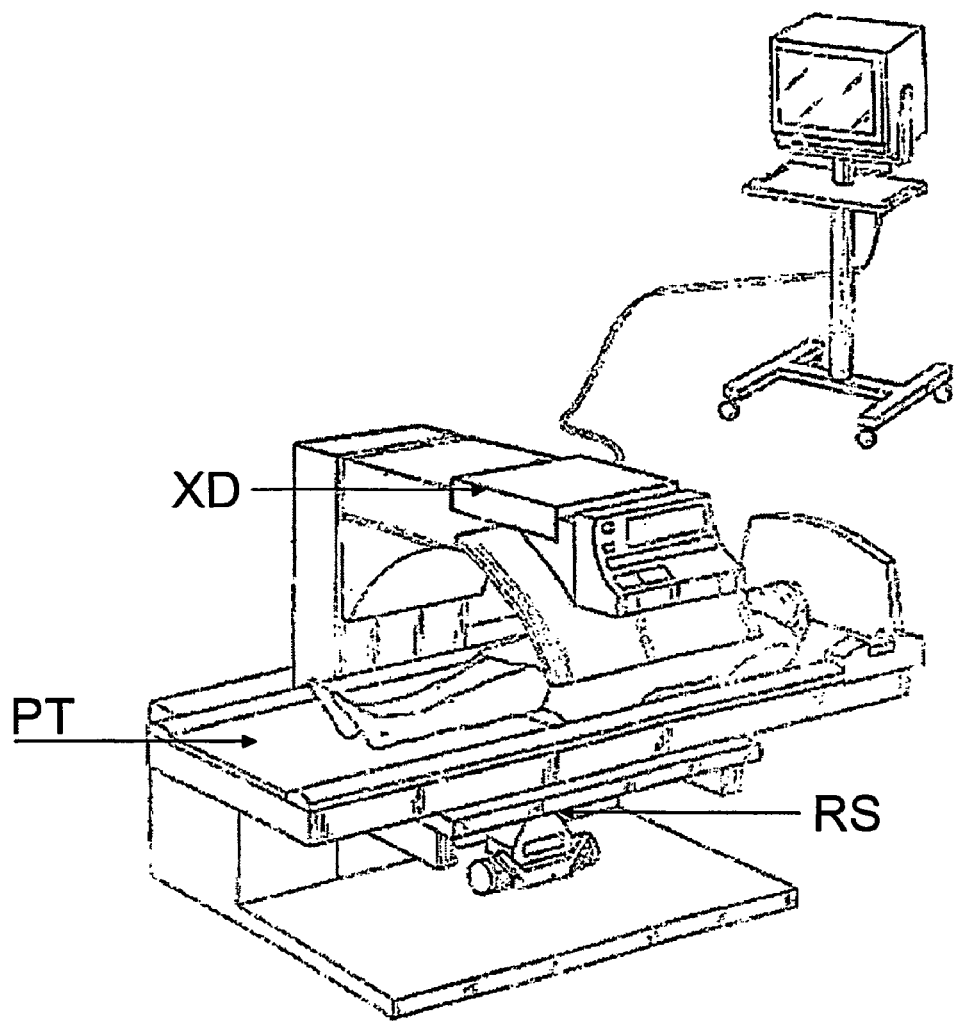
Figure 10:
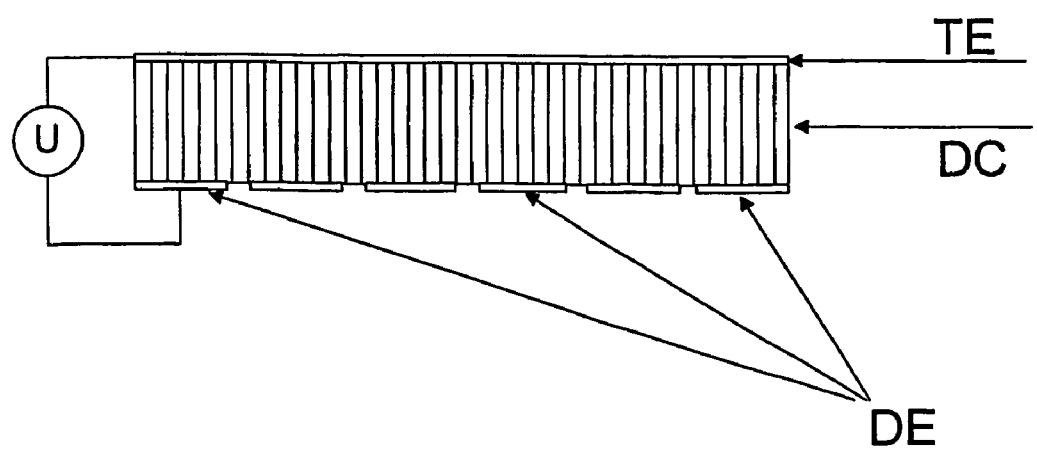

Several embodiments of the invention will be described in detail hereinafter with reference to the Figures. Therein:

FIG. 1 is a diagrammatic representation of an arrangement of surfaces which are associated with the sensitive areas in conformity with the present state of the art, FIG. 2 is a diagrammatic representation of an arrangement of sensitive surfaces which mesh with one another, FIG. 3 is a diagrammatic representation of an arrangement of four sensitive areas with a multiple dentation of average depth, FIG. 4 is a diagrammatic representation of an arrangement of four sensitive surfaces with a multiple dentation of larger depth, FIG. 5 is a diagrammatic representation of an arrangement of four sensitive surfaces with a dentation with pointed tooth elements, FIG. 6 is a diagrammatic representation of four sensitive surfaces with a dentation which is not regular but exhibits deviations, FIG. 7 is a diagrammatic representation of an arrangement of nine sensitive surfaces whose sensitive surfaces are interleaved, FIG. 8 is a diagrammatic representation of nine sensitive surfaces which mesh with one another, FIG. 9 shows an X-ray apparatus in which a detector arrangement in accordance with the invention is employed, and FIG. 10 is a cross-sectional view of the basic construction of a directly converting detector.

FIG. 1 shows a 2×2 arrangement of four flat sensitive areas P1, P2 which are denoted by shading and are known, for example, from their use in a flat X-ray detector (see, for example, U.S. Pat. No. 6,021,173 A) in which the sensitive areas are realized by way of photodiodes. The surfaces P1, P2 associated with the sensitive areas are referred to as the sensitive surfaces. An arrangement of this kind may form part of a larger matrix. The sensitive surfaces of the present embodiment are formed by photodiodes. Even though the detection process in the photodiode is characterized by a given absorption depth, the sampling properties are defined by the sensitive surface of the photodiodes.

With each photodiode in the present embodiment of a flat X-ray detector there is associated a switching transistor which propagates the charge stored in the capacitance of the photodiode during the read-out operation. This switching transistor is realized each time in the free (not-sensitive) area S1, S2 associated with the photodiode. In addition there are provided (not shown) read-out leads and bias voltage leads which extend between the photodiodes. Because of the leads extending between the photodiodes, it is difficult to indicate spatially separate areas which can be unambiguously associated with a detector element, since, for example, the line driver leads are associated with many detector elements in common. Therefore, the subdivision into rectangular areas C1, C2 as denoted by heavy lines need not necessarily be understood to be a physical subdivision into detector elements. The subdivision, however, shows that the detector surface can be subdivided into convex (in this case rectangular) elements in such a manner that each convex area C1, C2 encloses the entire sensitive surface of a detector element. In this context the term "detector element" is to be understood as the combination consisting of the sensitive area and the associated electronic circuitry. A convex subdivision into its elements can also be found for detectors whose detector rows or columns are offset relative to one another or for a hexagonal detector element arrangement. It is to be noted that the sensitive areas shown in the Figures may also be situated on a detector surface which is curved in space, for example, as is the case for detector arrangements for computer tomography apparatus which are arranged around the focus of the radiation source as the center on a segment of the surface of a cylinder. Curvature in both dimensions (for example, like a segment of a spherical surface) is also permissible.

When such a detector is read out, an electrical signal is read out from each detector element (for example, from a sample-and-hold stage). Each of the electrical signals corresponds to a respective sensitive surface. This results in a two-dimensional data image which corresponds to the object image MTF filtered by the detector.

In a detector which is based on optically encapsulated scintillator crystals (for example, scintillator crystals separated from one another by means of reflectors), the scintillator crystals do not serve for the pre-sampling filtering as is the case in a non-structured scintillator. In this case pre-sampling filtering can also be realized by the meshing of the scintillator crystals which are optically encapsulated from one another. The sensitive areas are then formed by the scintillator crystals and the meshing can be configured so as to be three-dimensional.

FIG. 2 shows an arrangement of four sensitive surfaces of detector elements in a 2×2 configuration. The sensitive surfaces D1, D2, D3, D4 of the individual detector elements are denoted by shading. The entire sensitive surface of the fourth detector element (situated at the bottom right) is now subdivided into four separate sensitive sub-surfaces D4.1, D4.2, D4.3, D4.4 which are separated, for example, for manufacturing-technical reasons from one another on the surface but are connected to one another in deeper layers. The sensitive area of the fourth detector element is thus formed by the total area of the sensitive sub-surfaces D4.1, D4.2, D4.3, D4.4. When such a detector element is read out, therefore, no electrical signal is associated with just one sensitive sub-surface; instead there is only one electrical signal which is associated with the entire sensitive surface D4=D4.1+D4.2+D4.3+D4.4. The geometrical shape of the sensitive surfaces is the same for each detector element (apart from the subdivision into a plurality of sensitive sub-surfaces as shown for the fourth detector element) and the arrangement shown may form part of a larger detector matrix. The heavy lines denote a gapless decomposition of the detector surface in envelopes C1, C2, C3, C4 of the sensitive surfaces D1, D2, D3, D4; each envelope encloses the entire sensitive surface of a single detector element, that is, exclusively the sensitive surface of this detector element. Because the individual sensitive surfaces of the various detector elements comprise convex projections which mesh each time with concave indentations of the sensitive surface of a neighboring detector element (i.e. interlocking, in this case meshing, of the sensitive surfaces of neighboring detector elements is obtained), the envelopes can no longer be shaped so as to be purely convex. Decomposition into overlap-free convex envelopes, as shown in FIG. 1, is no longer possible in this example. If the sensitive surfaces shown herein are, for example, the single electrodes in a directly converting detector, as a result of the dentation the sensitive surfaces in the dentated areas distribute the image of a hard edge among the two detector elements, the image thus undergoing low-pass filtering so that the desired effect a reduction of aliasing is achieved. The sensitive surfaces are again situated on a rectangular grid (denoted by the dashed lines). However, this is not to be considered a limitation, since other grids, for example, hexagonal or irregular grids, are also understood to be covered by the general concept of the invention.

As opposed to, for example, a capacitive coupling between neighboring sensitive surfaces, the meshing ensures that the sharing of signal contributions occurs only in the dentated areas, whereas a capacitive coupling mixes the signals from the entire sensitive surface of neighboring detector elements. The latter corresponds to a filtering after the sampling by means of the sampling function of the object image which is given by the sensitive surfaces, so that aliasing effects cannot be reduced.

FIG. 3 and FIG. 4 show further examples of different dentations of neighboring sensitive surfaces. Only the envelopes which follow the sensitive surfaces are now shown. It is to be understood that the sensitive surfaces follow the dentations of the envelopes as represented in FIG. 2 by the shaded sensitive surfaces, that is, a convex projection of the envelope also follows a convex projection of the sensitive surfaces in such a manner that when the envelopes mesh the sensitive surfaces also mesh. FIG. 3 shows a dentated structure which is more complex than the dentation shown in FIG. 2, and FIG. 4 shows a dentation which is deeper than that in FIG. 3.

FIG. 5 shows envelopes of meshing detector elements, the dentation being realized by way of triangular teeth. The sensitive surfaces (not shown) should again follow these envelopes, so that the sensitive surfaces comprise corresponding triangular teeth. Evidently, arbitrary other geometrical shapes can also be used for the dentation, for example, trapezium-like teeth, triangular teeth with rounded tips, semi-circular teeth, dentations which follow a sine curve, etc. Furthermore, all dentations need not be the same in all cases; different forms of dentation can be used on different sides of the detector elements, or the dentation geometry may change in one position or there may be different concurrent tooth geometries. The number of teeth may also be substantially larger than shown, or there may be teeth with barbs or widened portions (for example, as in the case of interlocking parts of a puzzle) or there may be further side teeth.

FIG. 6 shows the envelopes for a further dentation configuration. The shape of the dentation is changed between different neighboring detector elements, which means that the geometrical shape of the envelopes does not remain the same but changes. Such a change may take place gradually (that is, with only slight changes from one detector element to another), or in a pronounced fashion; such changes may be accidental or may follow a pattern or obey a rule. An additional secondary condition that the overall surface of the envelope or the sensitive surface enclosed by the envelope should remain constant could also be imposed. Such a change of the dentation geometry is advantageous so as to avoid moiré-like effects which are due to regular structures in the image signal, for example, from regular line structures.

FIG. 7 shows an arrangement of nine detector elements in a 3×3 configuration. Instead of using dentations, the interlocking is achieved by means of interleaved sensitive surfaces. For the sake of clarity the various sensitive parts of the surface which belong to the central detector element are denoted by shading. As for the dentated detector elements, sampling at the area of the neighboring detector element is achieved by interleaving of the sensitive surfaces. It is to be understood that the connection between the sensitive parts of the surface associated with one detector element is realized, for example, in deeper metal layers. Such a connection V1 of the surface parts which are not coherent on the surface is shown in dashed form, by way of example, for the sensitive surface parts D1.1 and D1.3. The interleaving is achieved in that the sensitive surfaces comprise free areas 720 in which sensitive surface parts 710 of neighboring detector elements are realized. Adjacent the large sensitive surface part D1.1 of the central detector element in this embodiment there are situated further sensitive surfaces D1.2, D1.3 which belong to this detector element and are realized in corresponding free areas of the sensitive surfaces D2.1 of neighboring detector elements. Analogously, the sensitive surface part D1.1 of the central detector element includes free areas in which sensitive surface parts D2.2 of neighboring detector elements are realized. As opposed to the meshing by way of teeth, a signal can thus be extracted from the next detector element but one because at that location there is a free area in which a sensitive surface part is realized which is connected to the corresponding next neighbor but one. As shown in FIG. 7, there is overlap between each of the sensitive areas to allow the sensitive surface parts 720 to be positioned in the free areas 710. In this example of engagement it is again impossible to realize a gap-free subdivision of the detector surface into convex envelopes which enclose each time only all sensitive surface parts of a detector element.

As for the dentations, it is to be understood again that the interleaving can be carried out by way of free areas of different geometrical shape and sensitive surfaces of neighboring detector elements which are realized therein, and also the type of interleaving may vary etc. Furthermore, dentation and interleaving may also be combined.

FIG. 8 shows interleaving in the case of 3×3 arrangement of detector elements in which there are no fully enclosed free areas in the sensitive areas of the detector elements, but cutouts in which sensitive surface parts of neighboring detector elements are realized. This is illustrated for the central detector element whose sensitive surface parts are denoted by shading. If the free areas of neighboring sensitive surfaces were shifted relative to one another, there would each time be a respective envelope for the sensitive surfaces of the detector elements in such a manner that the dentations would comprise barbs, that is, in such a manner that two toothed detector elements could no longer be pulled apart within the detector surface. This illustrates the smooth transition between dentation and interleaving.

FIG. 9 shows a typical imaging X-ray system in which a detector arrangement in accordance with the invention can be used. It includes an X-ray source RS which exposes a patient who is arranged on the patient table PT to emitted X-rays. The radiation that is not absorbed by the patient table PT and the patient is converted into an image by the X-ray detector XD, which image can be displayed, for example, on a monitor or be entered into a hospital data base system.

FIG. 10 is a diagrammatic cross-sectional view of the three essential elements of a detector comprising a directly converting material. At the X-ray entrance side there is situated a non-structured top electrode TE which is deposited on the directly converting material DC (for example, CZT, cadmium zinc telluride, CdTe, PbO, $PbI_2$, $HgI_2$ or amorphous selenium, a-Se). On the lower side of the directly converted material there are situated the single electrodes DE. Between the top electrode TE and the single electrodes DE there is applied a voltage U such that charge carriers generated by the absorption of X-rays are accelerated and produce an electrical signal; a slight lateral drift of the charge carriers now hardly contributes to pre-sampling filtering. A current flow then arising can be stored, for example in a capacitance so as to be read out at a given rate.

The invention claimed is:

1. A detector arrangement for the conversion of electromagnetic radiation into electrical signals, which arrangement includes sensitive areas, each of which corresponds to a respective electrical signal, wherein at least two of the sensitive areas mesh with one another by positioning a portion of one of the sensitive areas in a fully enclosed free area of another one of the sensitive areas.

2. A detector arrangement as claimed in claim 1, wherein at least two of the sensitive areas mesh with one another by at least one of interleaving and dentation.

3. A detector arrangement as claimed in claim 1, wherein sampling properties of the sensitive areas are defined by a respective associated sensitive surface and that meshing is realized by way of the sensitive surfaces.

4. A detector arrangement as claimed in claim 1, wherein the sensitive areas are formed by at least one of photodiodes or electrodes.

5. A detector arrangement as claimed in claim 1, wherein at least a portion of each the sensitive areas overlaps a portion of another sensitive area.

6. A detector arrangement as claimed in claim 1, wherein the shape of the sensitive areas varies.

7. An imaging X-ray system which includes a detector arrangement as claimed in claim 1.

8. The detector arrangement of claim 1, wherein at least a portion of each the sensitive areas overlaps a portion of another sensitive area.

9. The detector arrangement of claim 1, wherein all of the sensitive areas mesh with one another by interleaving.

10. The detector arrangement of claim 1, wherein each of the sensitive areas is symmetrical.

11. A method for the conversion of electromagnetic radiation into electrical signals, which method comprises:

emission of electromagnetic radiation by a radiation source, detection of the electromagnetic radiation by means of a detector arrangement which includes sensitive areas, conversion of the electromagnetic radiation into electrical signals such that the sensitive areas of the detector arrangement correspond unambiguously to a respective electrical signal, wherein at least two of the sensitive areas mesh with one another so that a portion of one of the sensitive areas is positioned in a fully enclosed free area of another one of the sensitive areas, and propagation of the electrical signals.

12. The detector arrangement of claim 1, wherein the at least two of the sensitive areas that mesh with one another are connected to each other along a non-surface portion of the detector arrangement.

13. The method of claim 11, wherein the at least two of the sensitive areas that mesh with one another are connected to each other along a non-surface portion of the detector arrangement.

14. The method of claim 11, wherein the shape of the sensitive areas is the same.

15. The method of claim 11, wherein all of the sensitive areas mesh with one another by interleaving.

16. The method of claim 11, wherein each of the sensitive areas is symmetrical.

* * * * *